(12) United States Patent
Kwak et al.

(10) Patent No.: US 12,513,759 B2
(45) Date of Patent: Dec. 30, 2025

(54) TRANSMISSION/RECEPTION OF VRU IN WIRELESS COMMUNICATION SYSTEM

(71) Applicant: LG ELECTRONICS INC., Seoul (KR)

(72) Inventors: Minsung Kwak, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 513 days.

(21) Appl. No.: 17/912,800

(22) PCT Filed: Mar. 18, 2021

(86) PCT No.: PCT/KR2021/003352
§ 371 (c)(1),
(2) Date: Sep. 19, 2022

(87) PCT Pub. No.: WO2021/187910
PCT Pub. Date: Sep. 23, 2021

(65) Prior Publication Data
US 2023/0156836 A1     May 18, 2023

(30) Foreign Application Priority Data

Mar. 18, 2020   (KR) .................. 10-2020-0032972
Apr. 24, 2020   (KR) .................. 10-2020-0050195

(51) Int. Cl.
*H04W 4/40*    (2018.01)
*H04W 52/02*   (2009.01)
(Continued)

(52) U.S. Cl.
CPC ....... *H04W 76/14* (2018.02); *H04W 52/0225* (2013.01); *H04W 52/0274* (2013.01); *H04W 72/51* (2023.01)

(58) Field of Classification Search
CPC . H04W 76/14; H04W 76/28; H04W 52/0225; H04W 52/0274; H04W 52/0254;
(Continued)

(56) References Cited

U.S. PATENT DOCUMENTS 10,893,400 B2 *  1/2021  Lepp .............. H04W 4/021
2018/0090005 A1 * 3/2018  Philosof ............ G08G 1/164
(Continued)

FOREIGN PATENT DOCUMENTS

WO   2020036454   2/2020

OTHER PUBLICATIONS

Nguyen QH, Morold M, David K, Dressler F. Car-to-Pedestrian communication with MEC-support for adaptive safety of Vulnerable Road Users. Computer Communications. Jan. 15, 2020;150:83-93. (Year: 2020).*

(Continued)

*Primary Examiner* — Christopher M Crutchfield
*Assistant Examiner* — Syed Ahmed
(74) *Attorney, Agent, or Firm* — LEE, HONG, DEGERMAN, KANG & WAIMEY

(57) ABSTRACT

One embodiment relates to a sidelink-related operation method of a first VRU in a wireless communication system, comprising: the first VRU receiving a first VRU message from a second VRU; the first VRU turning off a VRU receiver for a time corresponding to an interval included in the first VRU message; and the first VRU turning on the VRU receiver after the interval and receiving a second VRU message, wherein the interval is determined on the basis of the time from when the second VRU transmits the first VRU message to when at least one of a moving direction or a speed is changed to a reference value or more.

13 Claims, 29 Drawing Sheets

(51) Int. Cl.
*H04W 72/51* (2023.01)
*H04W 76/14* (2018.01)
*H04W 76/28* (2018.01)

(58) Field of Classification Search
CPC ..... H04W 72/51; H04W 72/20; H04W 92/18; H04W 4/40; H04W 4/025; Y02D 30/70
USPC .......................................................... 370/329
See application file for complete search history.

(56) References Cited

U.S. PATENT DOCUMENTS

| | | | |
|---|---|---|---|
| 2018/0105108 A1* | 4/2018 | Sugimoto | G06N 3/006 |
| 2020/0196321 A1* | 6/2020 | Zhang | H04W 72/21 |
| 2022/0388505 A1* | 12/2022 | Sharma Banjade | G08G 1/096783 |

OTHER PUBLICATIONS

Huawei et al., "Further views on Rel-17 work area on NR sidelink enhancements for V2X and other use cases," 3GPP TSG-RAN Meeting #85, RP-191831, Sep. 2019, section 2.1.1.1-2.1.2.2, 15 pages.
Apple, "Support of Vulnerable Road User in NR V2X," 3GPP TSG-RAN Meeting #83, RP-190262, Mar. 2019, pp. 2-5, section 1-2.3, 5 pages.
Samsung, "Discussion on Support of Vulnerable Road User," 3GPP TSG-RAN WG2 Meeting #107, R2-1911327, Aug. 2019, section 1-2, 4 pages.
Futurewei, "Support of ProSe on the sidelink," 3GPP TSG-RAN WG1 #99, R1-1912432, Nov. 2019, section 1-2, 5 pages.
PCT International Application No. PCT/KR2021/003352, International Search Report dated Jul. 1, 2021, 3 pages.

* cited by examiner (a)

(b)

(a)

(b)

TRANSMISSION/RECEPTION OF VRU IN WIRELESS COMMUNICATION SYSTEM

CROSS-REFERENCE TO RELATED APPLICATIONS

This application is the National Stage filing under 35 U.S.C. 371 of International Application No. PCT/KR2021/003352, filed on Mar. 18, 2021, which claims the benefit of earlier filing date and right of priority to Korean Application No. 10-2020-0032972, filed on Mar. 18, 2020, and 10-2020-0050195, filed on Apr. 24, 2020, the contents of which are all incorporated by reference herein in their entirety.

TECHNICAL FIELD

The following description relates to a wireless communication system, and more particularly to an operation method and device related to vulnerable road users (VRU) message transmission/reception for reducing power consumption by a VRU.

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to provide an operation method related to a message transmission/reception of vulnerable road users (VRU).

Technical Solution

According to an embodiment, an operation method related to sidelink of a first vulnerable road user (VRU) in a wireless communication system includes receiving a first VRU message from a second VRU by the first VRU, turning off a VRU receiver for a time corresponding to an interval included in the first VRU message by a first VRUUE, and turning on the VRU receiver after the interval and receiving a second VRU message by the first VRU, wherein the interval is determined based on a time from when the second VRU transmits the first VRU message until at least one of a moving direction or a speed is changed to a reference value or more.

According to an embodiment, a first vulnerable road user (VRU) in a wireless communication system includes at least one processor, and at least one computer memory operatively connected to the at least one processor and configured to store instructions that when executed causes the at least one processor to perform operations, wherein the operations includes receiving a first VRU message from a second VRU by the first VRU, turning off a VRU receiver for a time corresponding to an interval included in the first VRU message by a first VRUUE, and turning on the VRU receiver after the interval and receiving a second VRU message by the first VRU, and the interval is determined based on a time from when the second VRU transmits the first VRU message until at least one of a moving direction or a speed is changed to a reference value or more.

An embodiment provides a processor for performing operations for a first vulnerable road user (VRU) in a wireless communication system, the operations including receiving a first VRU message from a second VRU by the first VRU, turning off a VRU receiver for a time corresponding to an interval included in the first VRU message by a first VRUUE, and turning on the VRU receiver after the interval and receiving a second VRU message by the first VRU, wherein the interval is determined based on a time from when the second VRU transmits the first VRU message until at least one of a moving direction or a speed is changed to a reference value or more.

An embodiment provides non-volatile computer-readable storage medium for storing at least one computer program including an instruction for causing at least one processor to perform operations for a user equipment (UE) when being executed by the at least one processor, the operations including receiving a first VRU message from a second VRU by the first VRU, turning off a VRU receiver for a time corresponding to an interval included in the first VRU message by a first VRUUE, and turning on the VRU receiver after the interval and receiving a second VRU message by the first VRU, wherein the interval is determined based on a time from when the second VRU transmits the first VRU message until at least one of a moving direction or a speed is changed to a reference value or more.

The first VRU message may include information on a speed, a direction, and a position of the VRU.

A maximum value of the interval may be set.

When the second VRU is in a stationary state, the interval may be a time during which the second VRU is expected to move.

The first VRU message may include information indicating a predetermined waiting time after turning on a VRU receiver after the interval.

A VRU message reception related profile of the second VRU may be preset according to a VRU type.

The VRU type may include a pedestrian, a cycle, a motorcycle, and an animal.

When the VRU type is the pedestrian, a profile 1 that is the VRU message reception related profile may not receive a VRU message.

Whether the profile 1 operates may be determined based on one or more of a VRU type, and mobility information.

The mobility information may include connectivity with a moving device of a VRU, and a moving speed.

Advantageous Effects

According to an embodiment, a number of times that vulnerable road users (VRU) receive a VRU message may be reduced to reduce power consumption.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

In various embodiments of the present disclosure, "I" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
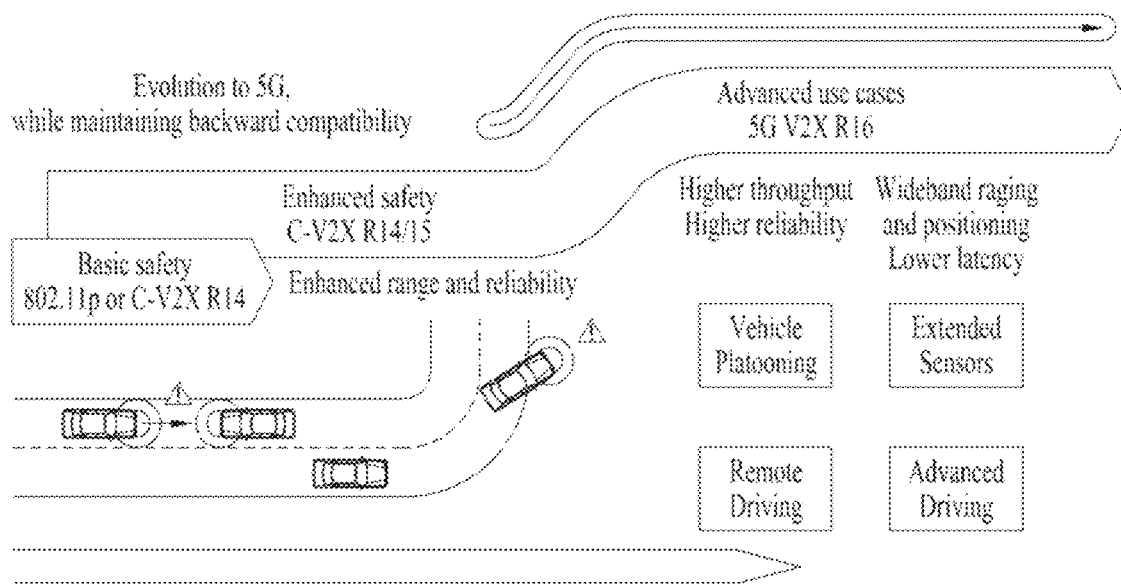
FIG. 1 is a diagram comparing vehicle-to-everything (V2X) communication based on pre-new radio access technology (pre-NR) with V2X communication based on NR.
Figure 2:
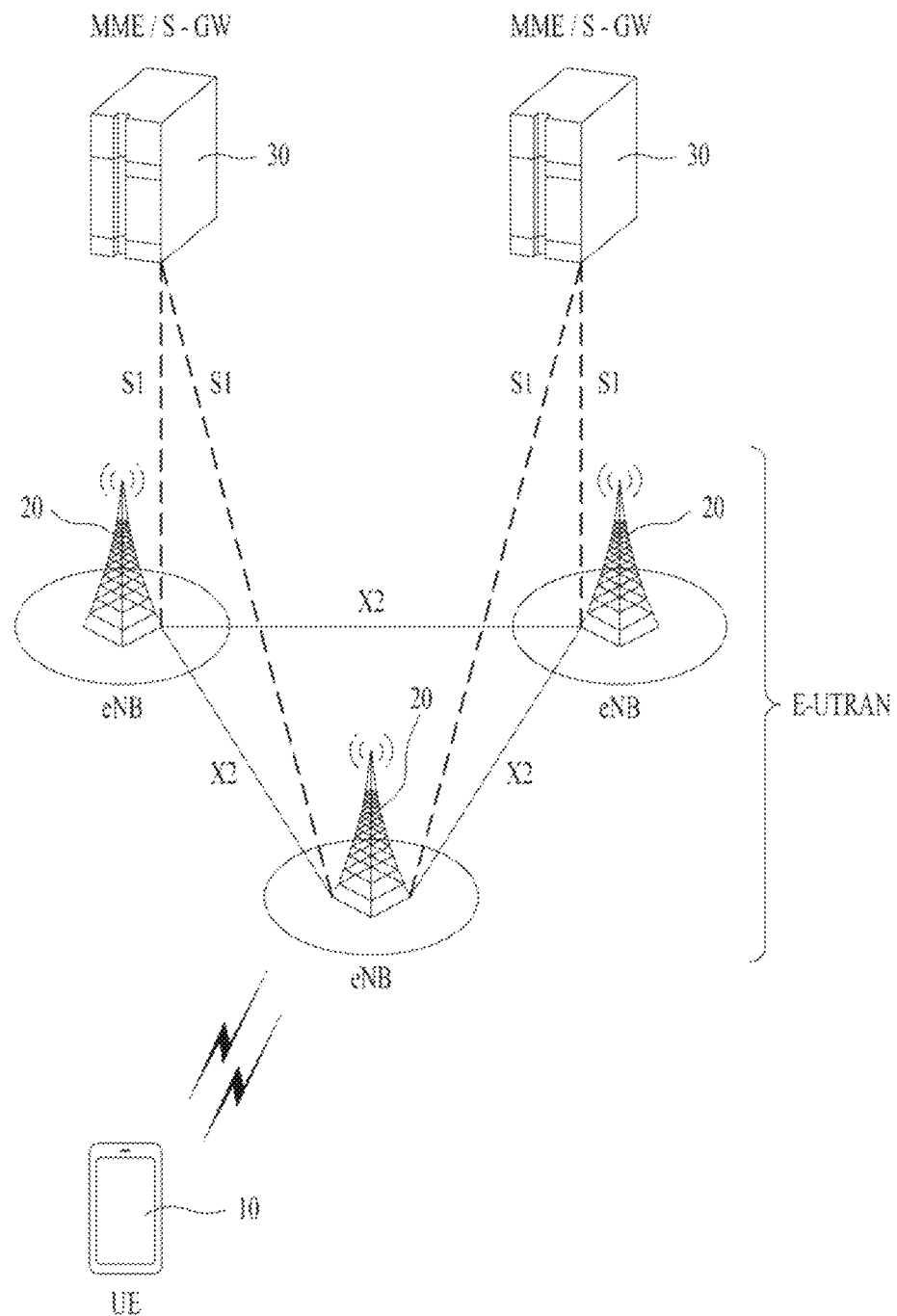
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
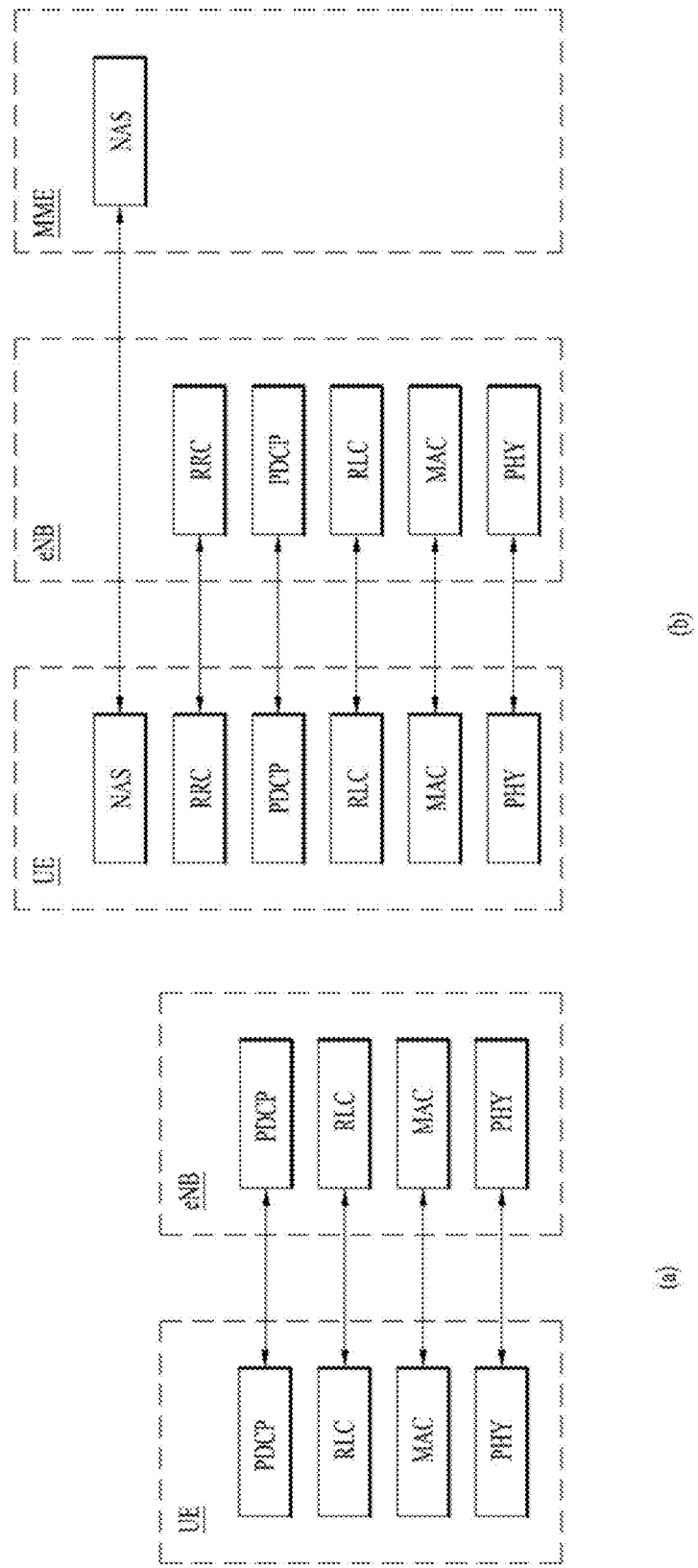
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC CONNECTED state, and otherwise, the UE is placed in RRC IDLE state. In NR, RRC INACTIVE state is additionally defined. A UE in the RRC INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
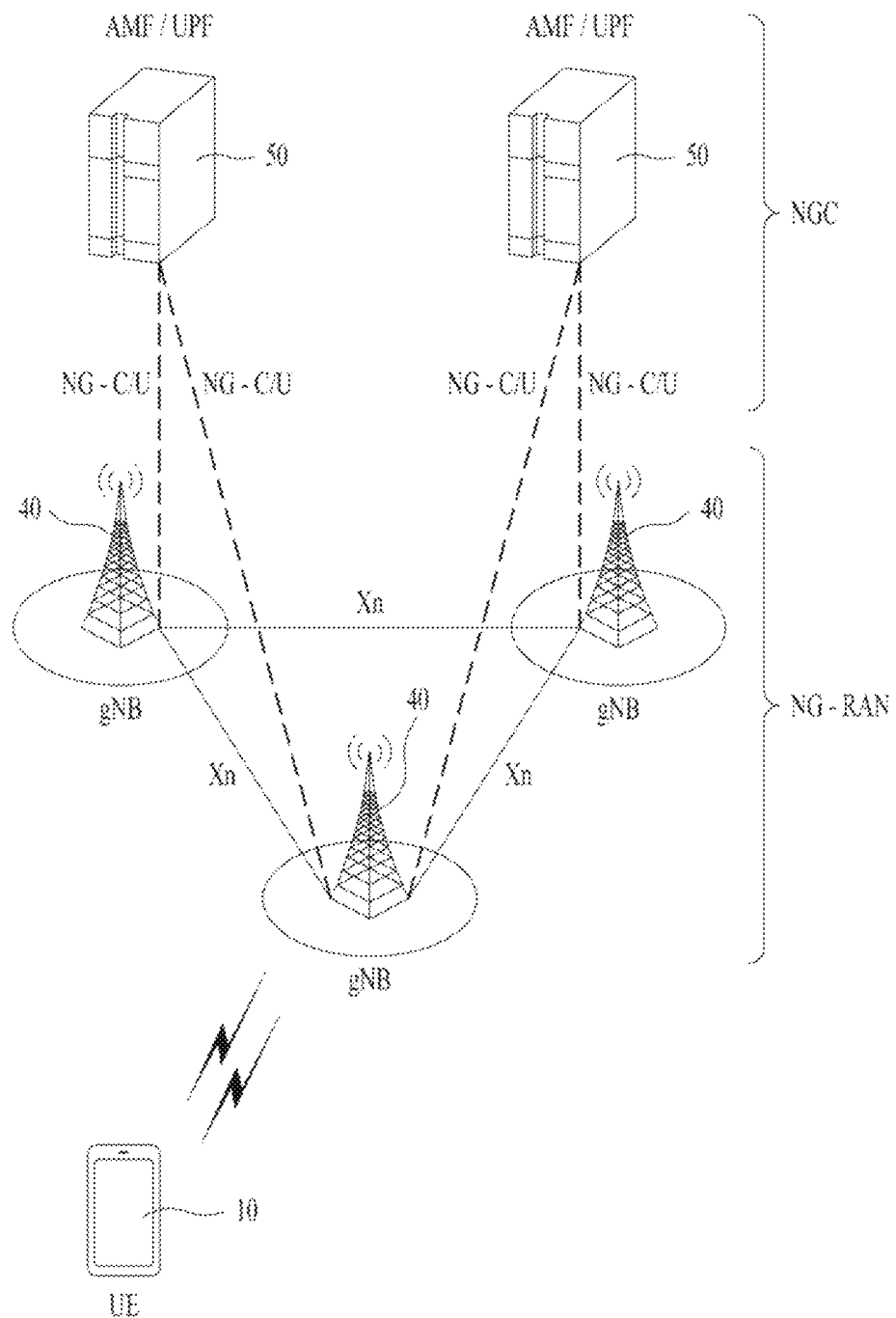
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
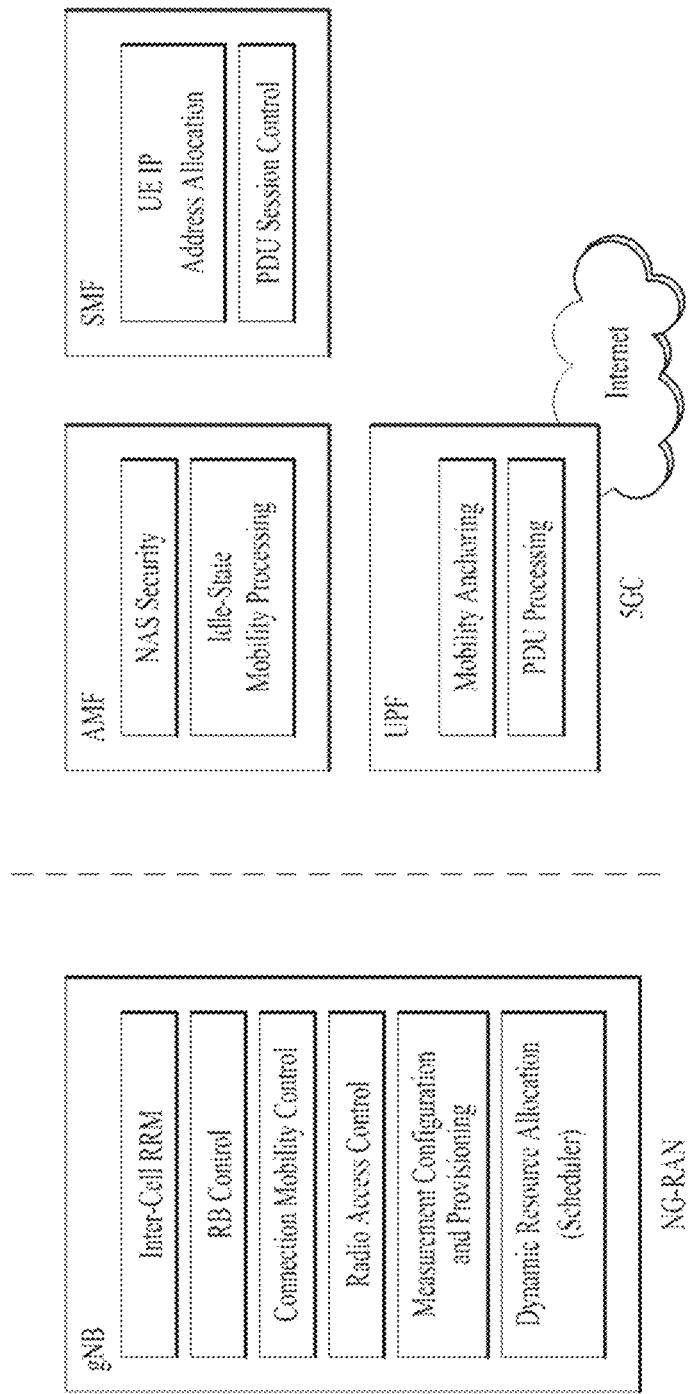
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
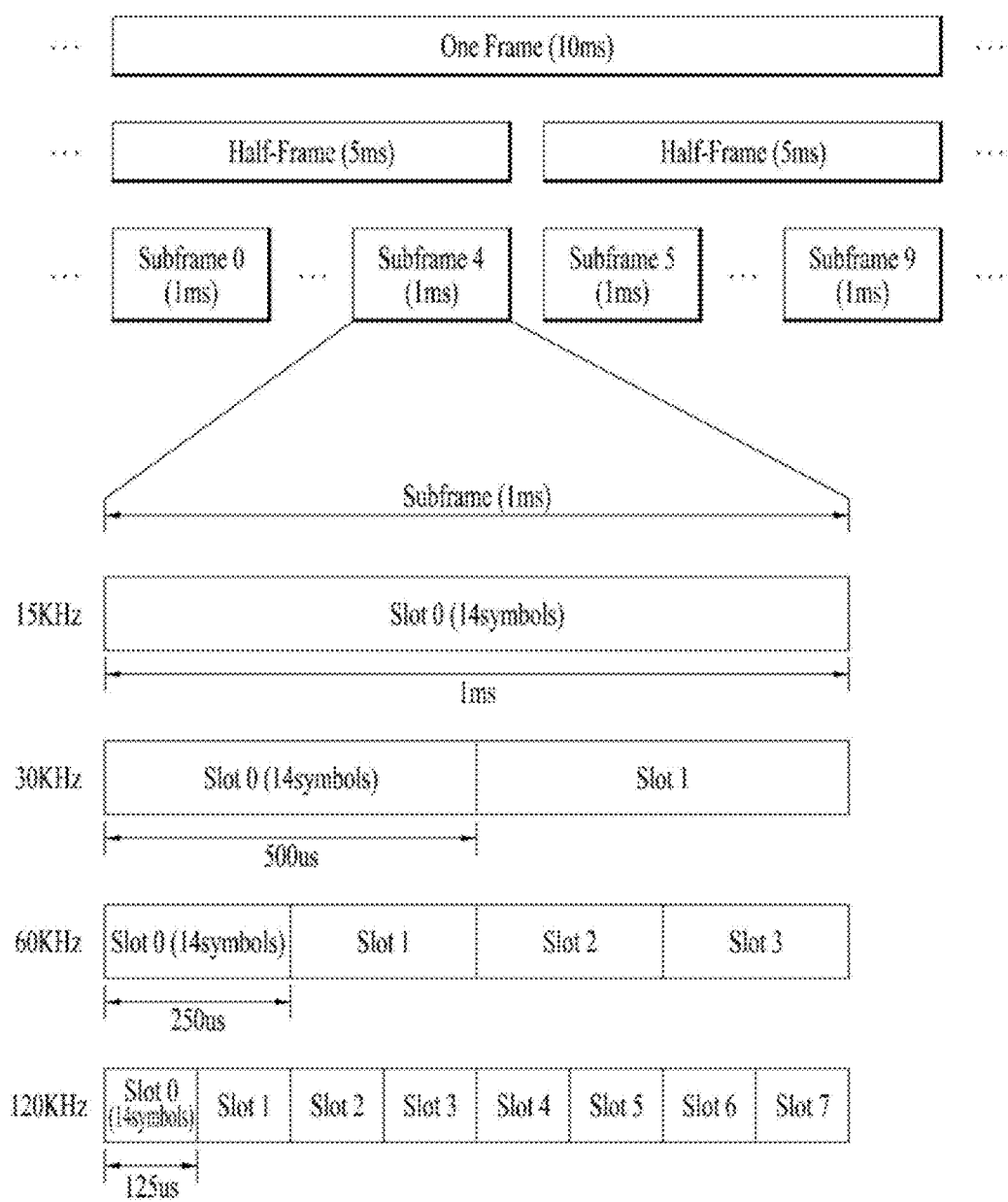
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N_{symb}^{slot}$, the number of slots per frame $N_{slot}^{frame,u}$, and the number of slots per subframe $N_{slot}^{frame,u}$ according to an SCS configuration μ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in Table 3. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in Table 4. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
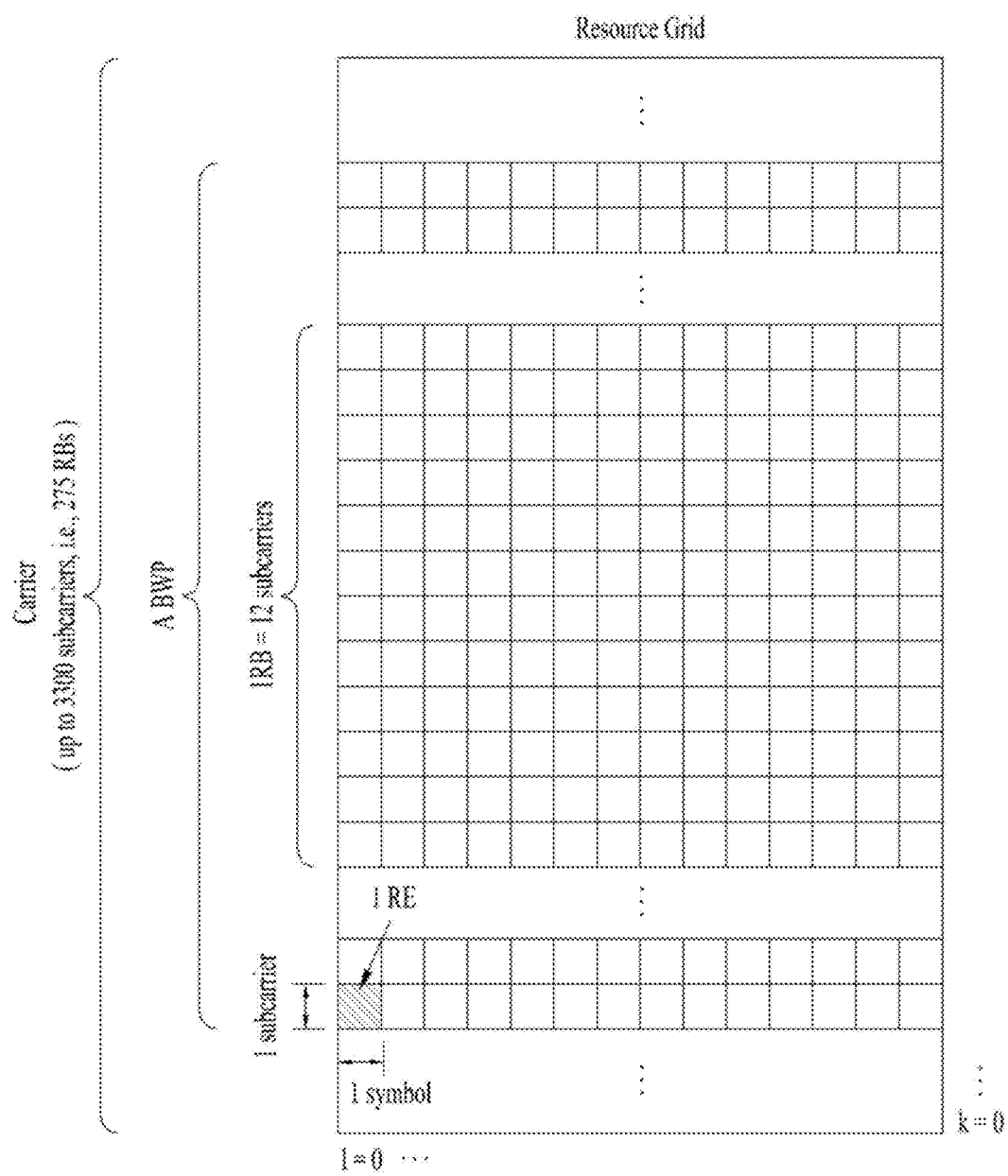
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
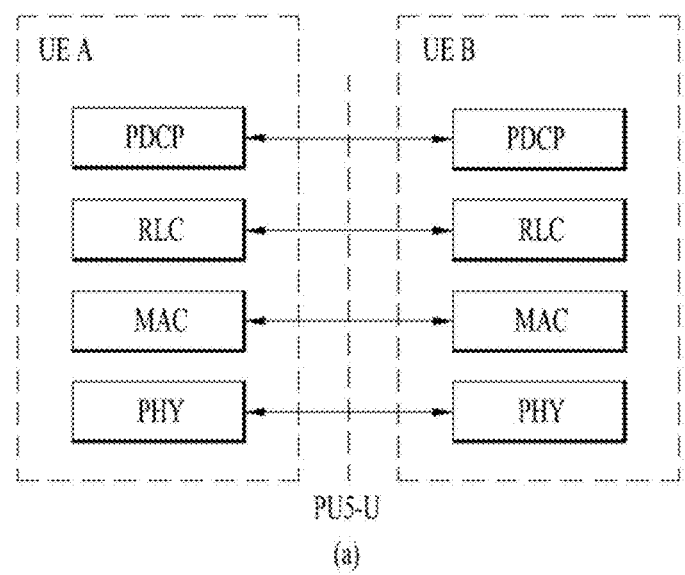
FIG. 8 is a diagram illustrating radio protocol architectures for sidelink (SL) communication according to an embodiment of the present disclosure.
Figure 8:
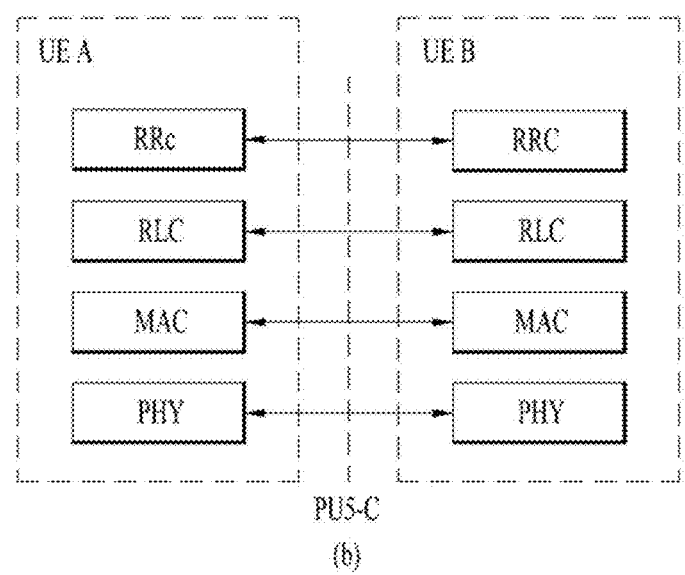

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
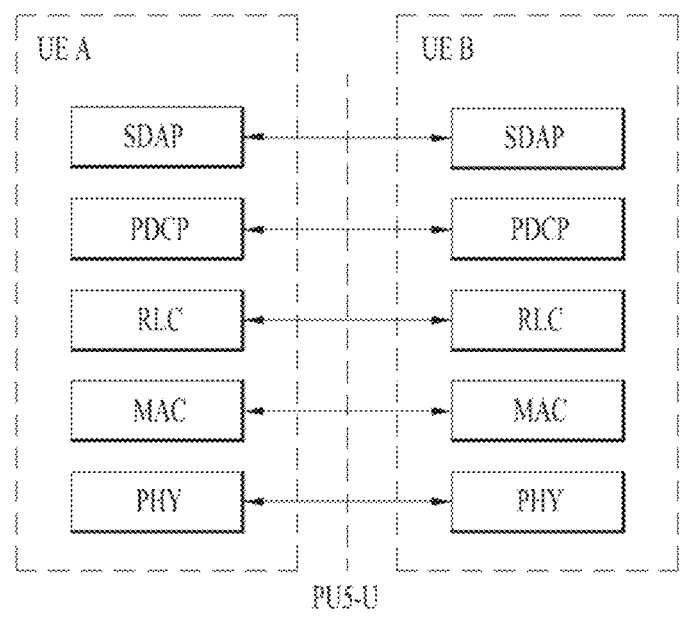
FIG. 9 is a diagram illustrating radio protocol architectures for SL communication according to an embodiment of the present disclosure.
Figure 9:
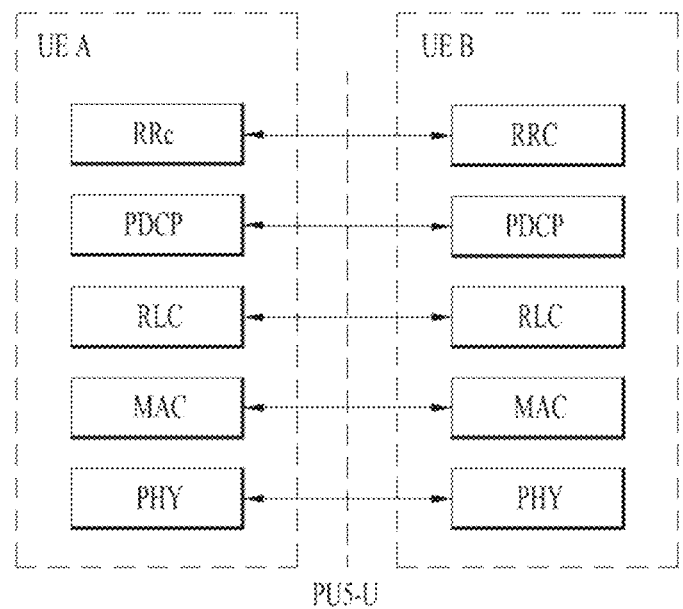

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
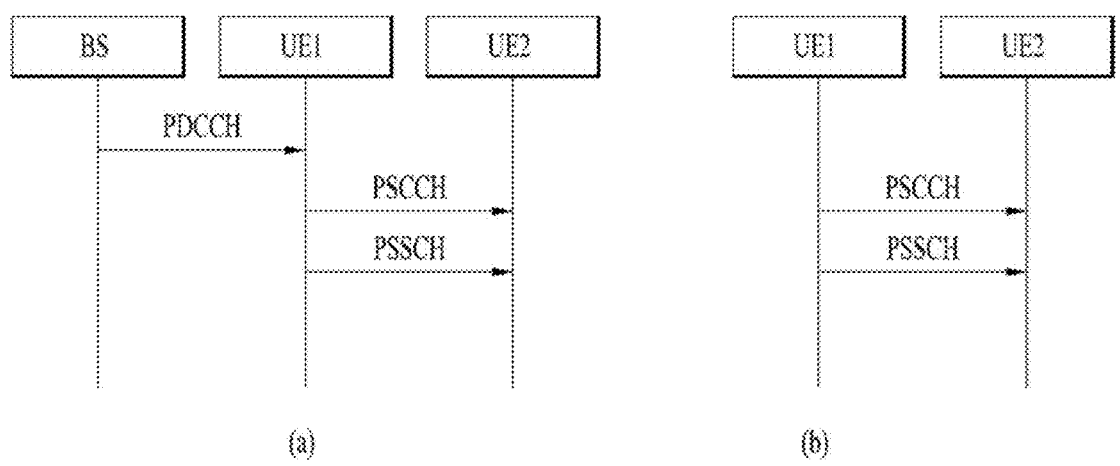
FIG. 10 illustrates a procedure in which a UE performs V2X or SL communication according to a transmission mode according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or an SL CSI-RS transmission indicator or information about the number of SL CSI-RS antenna ports (to be transmitted);

location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 11:
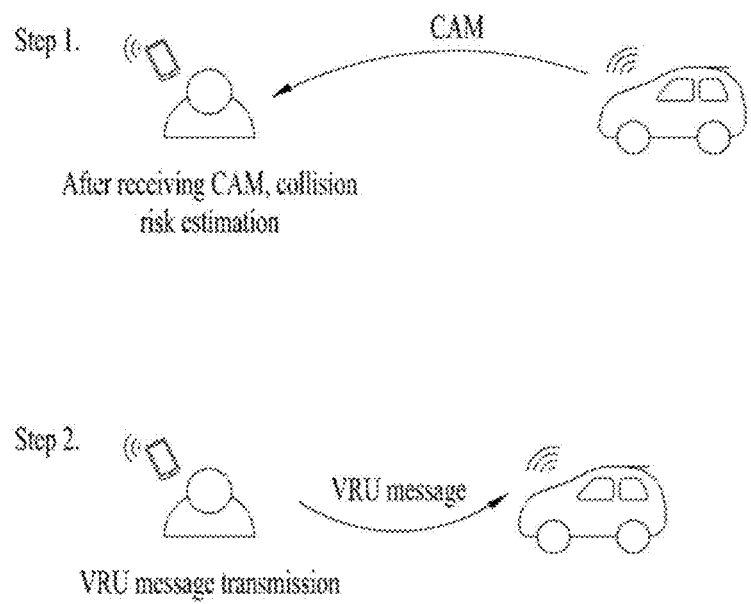
FIGS. 11 to 22 are diagrams for explaining embodiment(s).

FIG. 11 shows an example of a VRU message triggering method for preventing the risk of collision between a vehicle and a VRU. In this regard, a VRU device may receive a CAM transmitted from the vehicle and may performs collision risk estimation between the vehicle and the VRU. From a moment at which a time to collision value is estimated to be smaller than a specific threshold value, the VRU device may determine that the risk of collision between the vehicle and the VRU is high and may start to transmit a VRU message. In this case, a transmission interval of the VRU message transmitted by the VRU device may be calculated through a congestion control mechanism among values between predetermined minimum and maximum values. However, if a message reception function is continuously turned on to receive a message used for V2X communication, pedestrians or cyclists who are not capable of continuously charging power of a receiver may consume a battery of the receiver unnecessarily for V2X communication. Therefore, the following embodiment proposes a method of reducing the risk of VRU collision through V2X communication while minimizing battery consumption of the VRU device through a method in which the VRU device uses only transmission without reception of a V2V message or by minimizing massage reception as much as possible.

A first VRU according to an embodiment may receive a first VRU message. A first VRUUE may turn off a VRU receiver for a time corresponding to an interval included in the first VRU message. Then, the first VRU may turn on the VRU receiver to receive a second VRU message after the interval.

Here, the interval (NextVruMessageInterval) may be determined based on a time from when the second VRU transmits the first VRU message until at least one of a moving direction or a speed is changed to a reference value or more. That is, the interval may correspond to a time until the second VRU changes the moving direction (heading/traveling direction) to a preset value (angle) or more after transmitting the VRU message. Here, the time until the second VRU changes the moving direction (heading/traveling direction) to a preset value (angle) or more may be a value expected/set/estimated/determined on an expected/estimated movement path of the second VRU. For example, in FIG. 12, when the second VRU (VRU B) transmits a VRU message at T0, and the second VRU is scheduled to change the movement direction to a preset value (angle) or more after 3000 ms, the value of 3000 ms may be included in the first VRU message as an interval value.

When the second VRU is in a stationary state, the interval may be a time during which the second VRU is expected to move. That is, when the VRU is in a stationary state, if it is possible to estimate a time to start moving, the time may be measured as the interval (next VRU message interval). Alternatively, if it is predicted that the VRU is to change the traveling direction to 45 to 135 degree or −45 to −135 degree direction from a heading direction to which the VRU is currently directed, a timing of changing the direction may be measured as the next VRU message interval. In another example, in general, a VRU with an average VRU profile of 1 has a walking speed of 1.1 m/sec, and in this regard, when a time at which the VRU is capable of reaching 1.1 m from the current walking speed exceeds 1 sec, the next VRU message interval may be determined based on the speed.

The interval (NextVruMessageInterval) value may be expressed as an integer expressed in milliseconds, and a VRU Device may calculate a time when the current speed changes to a predetermined reference value or more in path prediction of the VRU device in consideration of a speed of the VRU device and a heading (moving direction/traveling direction) value and may apply the calculated time to the interval. Also, this value may be greater than the maximum interval of 1000 millisec. The interval may have a set maximum value. That is, for safety of the VRU, the maximum value may be limited to, for example, 5 seconds.

The first VRU message may include information related to the speed, direction, and location of the VRU. Table 5 below shows an example of a VRU message, and Table 6 shows a NextVruMessageInterval Data Type.

TABLE 5

| | |
|---|---|
| Descriptive Name | VRUMessage |
| Identifier | DataType_xxx |
| ASN.1 representation | VRUMessage ::= SEQUENCE {<br>VruId VruId,<br>VruType VruType,<br>VruProfile VruProfile,<br>Speed Speed,<br>Heading Heading,<br>...<br>NextVruMessageInterval NextVruMessageInterval<br>...<br>} |
| Definition | This DF (Data Frame) conveys VRU message. |
| Unit | N/A |

TABLE 6

| | |
|---|---|
| Descriptive Name | NextVruMessageInterval |
| Identifier | DataType_xxx |
| ASN.1 representation | NextVruMessageInterval::= INTEGER(1000..5000) |
| Definition | This DE (Data Element) indicates the time interval when the next VRU message transmitted. |
| Unit | N/A |

As described above, a time after which the next transmitted VRU message is transmitted may be included in the VRU message, and thus, through this method, a VRU as a VRU profile 1 or a VRU profile 2 that is not capable of charging power/electric power while moving may reduce battery consumption by reducing a time during which a reception function is turned on to receive a message.

Figure 12:
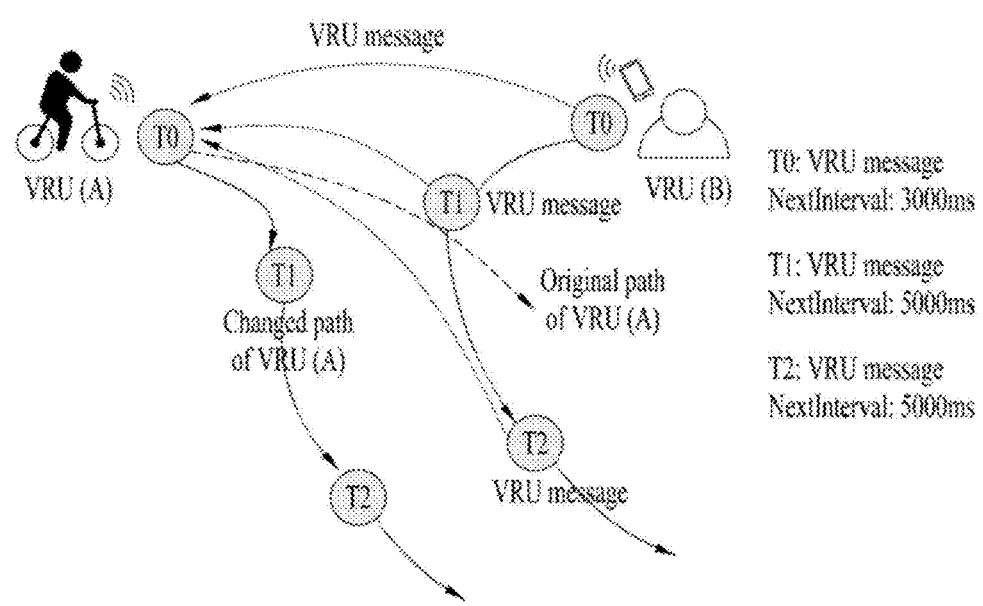

As briefly mentioned above, FIG. 12 shows an embodiment of reducing battery consumption by maximally reducing the time during which the VRU device turns on a reception function of the VRU message using NextVruMessageInterval. Referring to FIG. 12, at T0, a VRU A may receive the VRU message transmitted by a VRU B. A value of NextVruMessageInterval specified in the VRU message of the VRU B may be 3 seconds, and it may be determined that the VRU B currently walks in the current speed and direction until 3 seconds before. The VRU A may detect the risk of collision with the VRU B in an own path of the VRU A and may change the path of the VRU A.

At T1, the VRU A may receive a VRU message of the VRU B, transmitted after 3 seconds. The NextVruMessageInterval specified in a message of the VRU A transmitted at T1 may be 5 seconds, which means that the current speed is not increased until a next VRU message is transmitted and that heading is changed within a specific range. Also, the VRU A may detect that there is a possibility that heading of the VRU B received at T1 collides with a path on which the VRU A travels and may change a movement path of the VRU A.

At T2, the VRU A may receive the VRU message of the VRU B transmitted after 5 seconds. The VRU A may determine that there is no risk of collision between the current traveling direction of the VRU B and the traveling direction of the VRU A and may maintain a movement path of the VRU A.

The first VRU message may include information indicating a predetermined waiting time after turning on a VRU receiver after the interval. As such, when a reception period is adjusted by turning on a function to receive a Next VRU message via determination only by a value of the Next VRU Message Interval, uncertainty that reception of a VRU message is not guaranteed by 100% due to an unpredictable situation as shown below. In more detail, although a receiving device turns on the reception function after the NextVruMessageInterval, the receiving device may not receive the VRU message. This is to prevent reception of the VRU message from becoming impossible when a transmitting device is not capable of tolerating a delay time, determines that there is no message, and turns off the reception function. In this case, when a device transmitting a VRU message does not yet generate a message at an expected time, this case may include the case in which the device transmitting the VRU message generates the message at the expected time but there is a delay time until actual transmission.

Table 7 below shows an example in which a VRU message includes MaxLatencyTime Data Element.

TABLE 7

| | |
|---|---|
| Descriptive Name | VRUMessage |
| Identifier | DataType_xxx |
| ASN.1 representation | VRUMessage ::= SEQUENCE {<br>VruId VruId,<br>VruType VruType,<br>VruProfile VruProfile,<br>Speed Speed,<br>Heading Heading,<br>...<br>NextVruMessageInterval NextVruMessageInterval,<br>MaxLatencyTime MaxLatencyTime,<br>...<br>} |
| Definition | This DF (Data Frame) conveys VRU message. |
| Unit | N/A |

A MaxLatencyTime value may be expressed as an integer expressed in milliseconds and this value may mean the maximum latency time during which the VRU device does not turn off the reception function immediately if the VRU device does not receive the VRU message when the reception function is turned on according to the NextVruMessageInterval value. That is, the first VRU message may include information indicating a predetermined waiting time after turning on the VRU receiver after the interval. Table 8 below shows MaxLatencyTime.

TABLE 8

| | |
|---|---|
| Descriptive Name | MaxLatencyTime |
| Identifier | DataType_xxx |
| ASN.1 representation | MaxLatencyTime::= INTEGER(10..50) |
| Definition | This DE (Data Element) indicates the maximum latency time if the VRU device didn't get any VRU message even though the receiving function was turned on for the next VRU message according to the time interval. |
| Unit | N/A |

A VRU message reception related profile may be preset according to a VRU type. That is, a reception function of the V2X message may be profiled according to a VRU profile. The VRU message reception related profile, that is, a VRU Profile, may be exemplified in Table 9 below.

TABLE 9

| VRU Profile | V2X message receiving profile |
|---|---|
| Profile 1 (pedestrian) | No receiving/Transmission VRU message with frequency between 1 hz and 10 hz |

TABLE 9-continued

| VRU Profile | V2X message receiving profile |
| --- | --- |
| Profile 2 (cycle) | Receiving VRU message, No receiving other V2X messages (e.g. CAM, DENM, and etc.)/Transmission VRU message with frequency between 1 hz and 10 hz |
| Profile 3 (motorcycle) | Receiving VAM and CAM, DENM, and etc./Transmission CAM with VRU profile 3 container |
| Profile 4 (animal) | N/A |

As shown in Table 9, the VRU type may include a pedestrian, a cycle, a motorcycle, and an animal. When the VRU type is a pedestrian, a profile 1, which is the VRU message reception related profile, may indicate that the VRU message is not received. Whether the profile 1 operates may be determined based on one or more of a VRU type and mobility information. Here, the mobility information may include connectivity with a moving device and moving speed of the VRU.

Hereinafter, various operations between profiles in relation to the VRU profile will be described.

Figure 13:
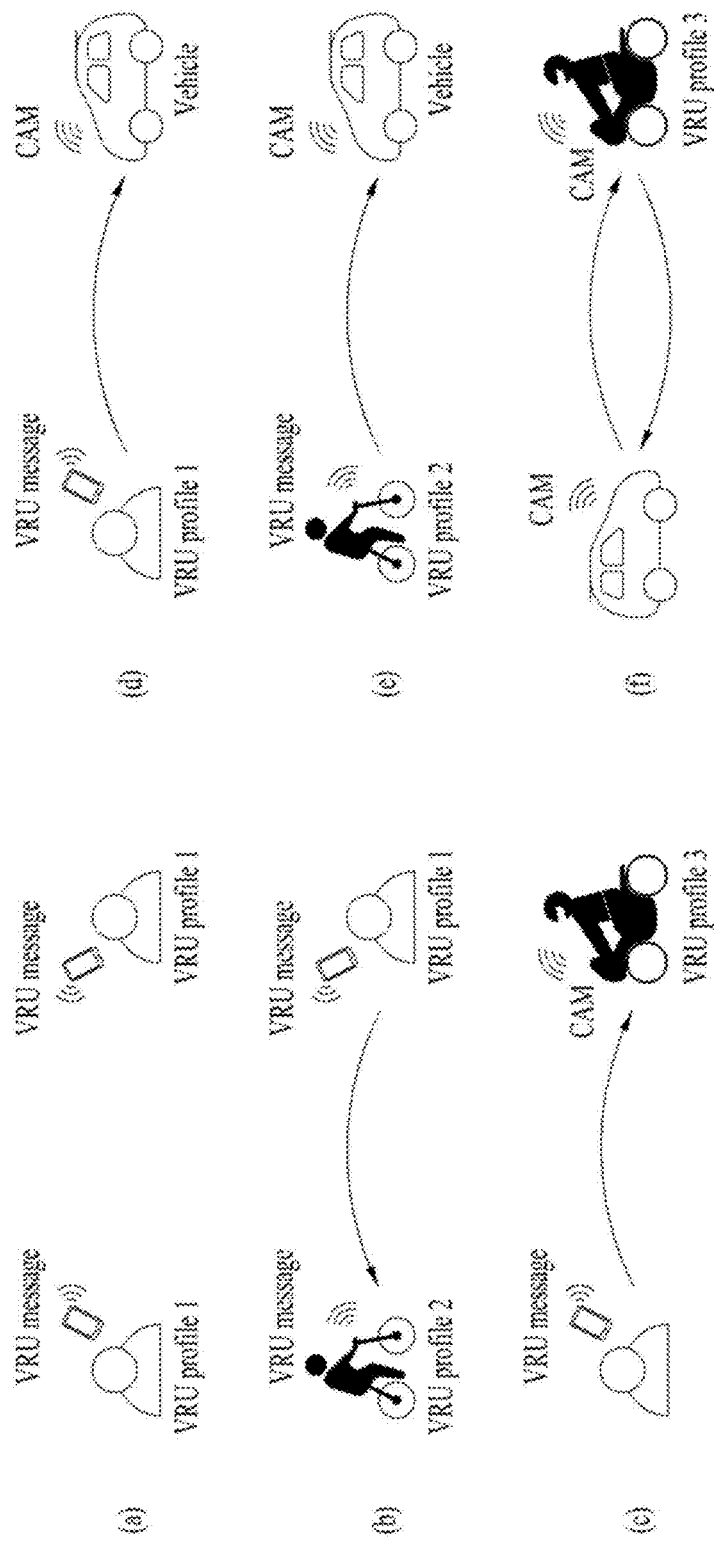

FIG. 13(a) shows an operation between VRU profiles 1. The VRU profile 1 may have a V2X message receiving profile that does not receive all V2X messages including the VRU message. In this case, the VRU may be a pedestrian, and an average walking speed of a general person may be calculated as 4 km/h. Therefore, there may be a risk of collision when both VRUs do not receive the VRU message transmitted by another VRU during the operation between the VRU profiles 1. However, in consideration of movement speed, there may be a high probability that VRUs are capable of physically avoiding each other without colliding.

Alternatively, the VRU may determine whether the VRU profile 1 operates based on the VRU type and the mobility information. For example, when the VRU type is a terminal of a pedestrian and has no (electrical) connection (connectivity) with a separate moving device, the VRU type may be set to the VRU profile 1. Alternatively, if the moving speed of the VRU is less than a preset threshold, the VRU may operate in the VRU profile 1, or if the moving speed of the VRU is maintained below the preset threshold for a predetermined time period, the VRU may operate in the VRU profile 1. For example, a pedestrian may have mobility less than 4 to 6 Km/h, and thus the preset threshold may be determined to be a value between 4 to 6 Km/h, and when a speed less than the threshold is detected, the VRU may operate in the VRU profile 1.

FIG. 13(b) shows an operation between a VRU profile 1 and a VRU profile 2. The VRU profile 1 may have a V2X message receiving profile that does not receive all V2X messages including the VRU message. The VRU profile 2 may have a reception function profile that receives the VRU message and does not receive other V2X messages (CAM, DENM, CPM, etc.). In this case, when a VRU as Profile 1 does not receive the VRU message, there may be a risk of collision with a VRU as Profile 2, but an embodiment proposes a method in which a VRU as a VRU profile 2 receives a VRU message transmitted by a VRU as a VRU profile 1 and a cyclist as the VRU profile 2 avoids a pedestrian as the VRU profile 1.

FIG. 13(c) shows an operation between a VRU profile 1 and a VRU profile 3. The VRU profile 1 may have a V2X message receiving profile that does not receive all V2X messages including a VRU message. The VRU profile 3 may have a reception function profile that receives a VRU message and all V2X messages. In this case, when a VRU as Profile 1 does not receive the VRU message or a CAM, there may be a risk of collision with a VRU (motorcyclist) as Profile 3, but an embodiment proposes a method in which a VRU as a VRU profile 3 receives a VRU message transmitted by a VRU as a VRU profile 1 and a motorcyclist as the VRU profile 3 avoids a pedestrian as the VRU profile 1. The VRU profile 3 may be a VRU Device that is capable of charging power during moving, and thus may be determined as a profile that is capable of receiving all V2X messages from reception function profiles.

FIG. 13(d) shows an operation between a VRU profile 1 and a vehicle. The VRU profile 1 may have a V2X message receiving profile that does not receive all V2X messages including the VRU message. The vehicle may receive the VRU message and all V2X messages. In this case, when a VRU as Profile 1 does not receive a CAM transmitted from the vehicle, there may be a risk of collision with an oncoming vehicle, but an embodiment proposes a method in which the vehicle receives a VRU message transmitted from a VRU as the VRU profile 1 and the vehicle avoids a pedestrian as the VRU profile 1. The vehicle may be charged with power during moving.

FIG. 13(e) shows an operation between a VRU profile 2 and a vehicle. The VRU profile 2 may have a V2X message receiving profile that receives only a VRU message and does not receive all other V2X messages. The vehicle may receive the VRU message and all V2X messages. In this case, when a VRU cyclist as Profile 2 does not receive a CAM transmitted from the vehicle, there may be a risk of collision with an oncoming vehicle, but an embodiment proposes a method in which the vehicle receives a VRU message transmitted from a VRU as a VRU profile and avoids a cyclist as the VRU profile 2. The vehicle may be charged with power during moving.

FIG. 13(f) shows an operation between a VRU profile 3 and a vehicle. The VRU profile 3 may have a V2X message receiving profile that receives all V2X messages including a VRU message. The vehicle may receive the VRU message and all V2X messages. In this case, when a VRU motorcyclist as Profile 3 receives a CAM transmitted from a vehicle to estimates a risk of collision between the VRU motorcyclist and the vehicle and determines that the collision risk exceeds a specific threshold to causes a high risk, the VRU motorcyclist may transmit the VRU message or the CAM transmitted from the VRU as the VRU profile 3. The vehicle and the VRU as the VRU profile 3 may select a method of receiving a V2X message therebetween to reduce the collision risk. The vehicle and the VRU as the VRU profile 3 may be charged with power during moving.

In relation to the above description, a first VRU may include at least one processor, and at least one computer memory operatively connected to the at least one processor and configured to store instructions that when executed causes the at least one processor to perform operations, the operations may include receiving a first VRU message from a second VRU by the first VRU, turning off a VRU receiver for a time corresponding to an interval included in the first VRU message by a first VRUUE, and turning on the VRU receiver after the interval and receiving a second VRU message by the first VRU, and in this case, the interval may be determined based on a time from when the second VRU transmits the first VRU message until at least one of a moving direction or a speed is changed to a reference value or more.

In the processor for performing operations for the first VRU, the operations may include receiving a first VRU message from the second VRU by the first VRU, turning off the VRU receiver for a time corresponding to the interval included in the first VRU message by the first VRUUE, and turning on the VRU receiver after the interval and receiving the second VRU message by the first VRU, and in this case, the interval may be determined based on a time from when the second VRU transmits the first VRU message until at least one of a moving direction or a speed is changed to a reference value or more.

Provided may be a non-volatile computer-readable storage medium for storing at least one computer program including an instruction for causing at least one processor to perform operations for a user equipment (UE) when being executed by the at least one processor, the operations including receiving a first VRU message from a second VRU by the first VRU, turning off a VRU receiver for a time corresponding to an interval included in the first VRU message by a first VRUUE, and turning on the VRU receiver after the interval and receiving a second VRU message by the first VRU, and in this case, the interval may be determined based on a time from when the second VRU transmits the first VRU message until at least one of a moving direction or a speed is changed to a reference value or more.

Figure 14:
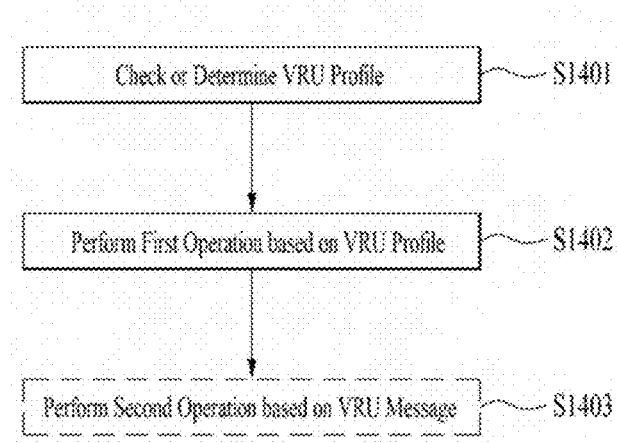

FIG. 14 shows a method of receiving a VRU message related to LTE-V2X or 5G communication related to the aforementioned embodiments. Referring to FIG. 14, a first device (a UE, a VRU, or a vehicle) may check or determine a VRU profile corresponding to the first device among a VRU profile 1, a VRU profile 2, and a VRU profile 3 (S1401). For example, the first device may determine or check a VRU profile corresponding to the first device based on a type of the first device (whether the first device is a UE of a VRU or a pedestrian related to a moving device such as a vehicle or a bicycle, or a VRU), a moving speed, or the like. Here, the VRU profile 1 may be related to a reception mode in which all V2X messages including the VRU message are not received, the VRU profile 2 may be related to a reception mode in which the VRU message is received and other V2X messages (CAM, DENM, and CPM) are not received, and the VRU profile 3 may be related to a reception mode of a reception function of receiving the VRU message and all V2X messages.

The first device may perform a first operation based on the determined or checked VRU profile (S1403). For example, in the case of the VRU profile 1, the first device may perform an operation of transmitting a VRU message as the first operation. In the case of the VRU profile 2, the first device may perform an operation of transmitting the VRU message and/or an operation of receiving the VRU message from other devices as the first operation. The first device as the VRU profile 2 may not receive the V2X message such as a CAM, a DENM, or a CPM. In the case of the VRU profile 3, the first device may perform an operation of transmitting the VRU message and/or an operation of receiving a message related to V2X from other devices as the first operation. Here, a message related to V2X may include a message such as the VRU message, the CAM, the DENM, or the CPM.

When the first device performs the first operation based on the VRU profile 2 or the VRU profile 3, the first device may perform the second operation based on a VRU message received from the other device (S1405). The second operation may be a control operation of a movement path and a moving speed based on mobility information (a moving speed, or a moving direction) and/or information on a transmission period of the VRU, included in the VRU message. When the first device performs the first operation based on the VRU profile 2, the first device may determine an activation time of the reception function of the VRU message as the second operation.

Figure 15:
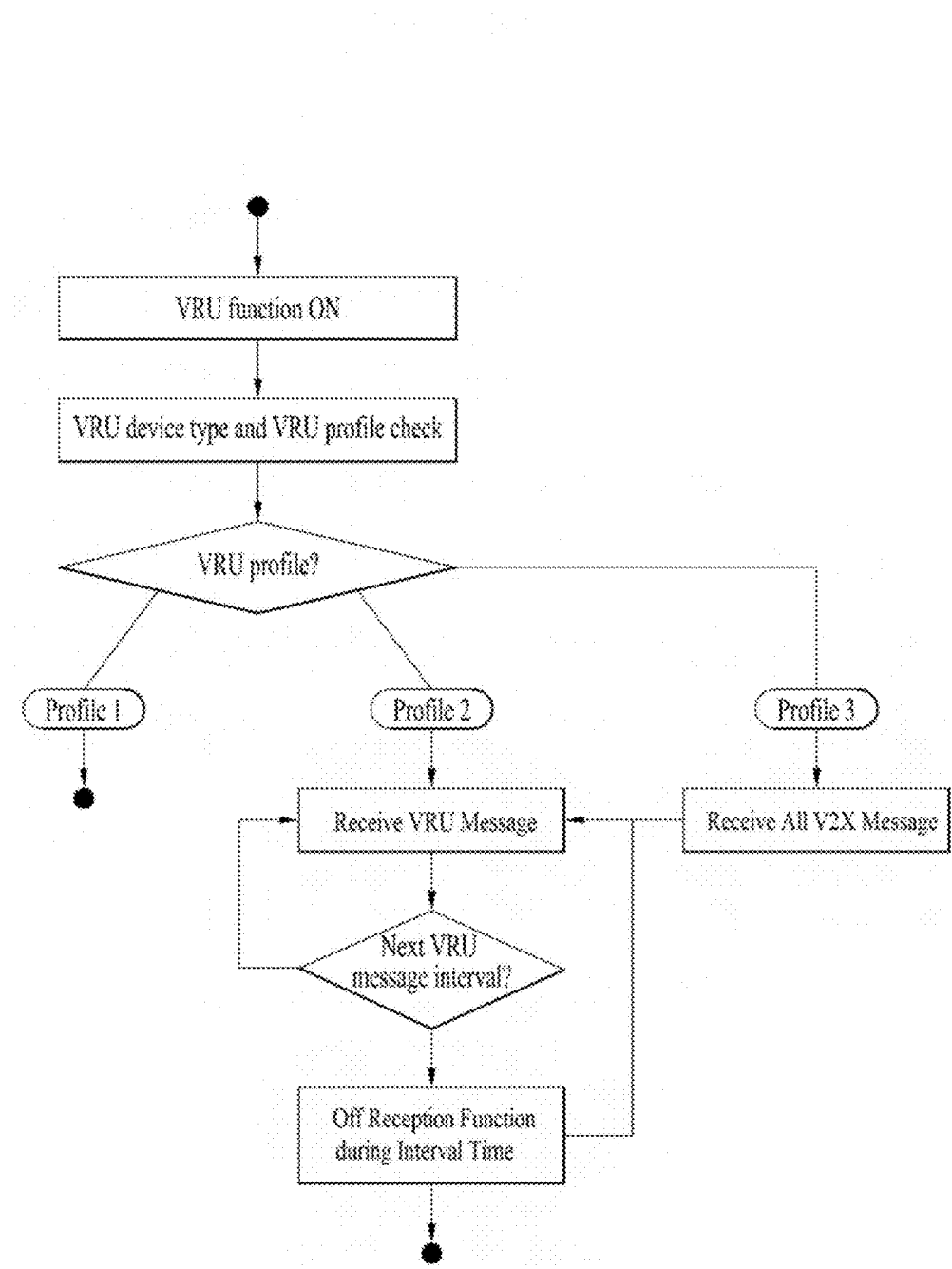

FIG. 15 shows a flowchart related to the above description, and each step may be referred to in the above description.

Figure 16:
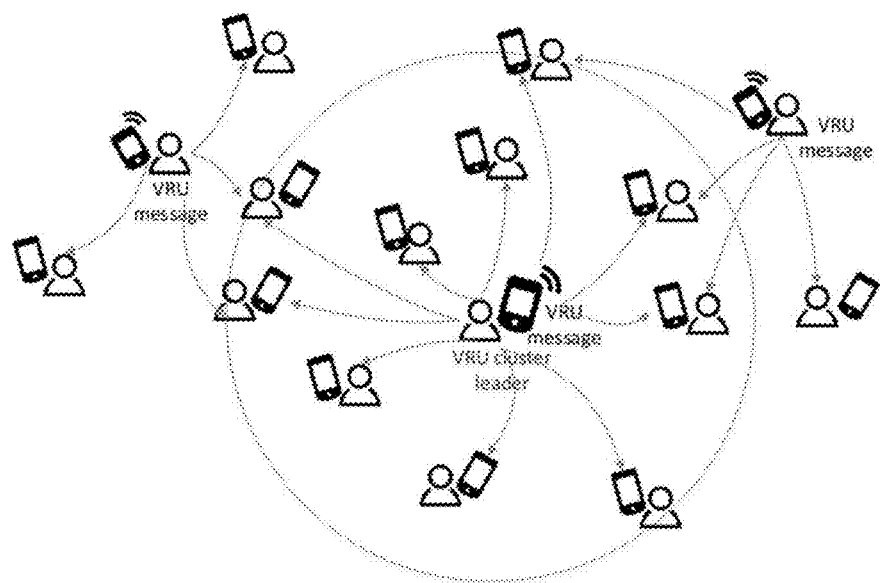

FIG. 16 shows an example of a VRU cluster member for receiving a VRU message transmitted from a VRU cluster leader. The VRU cluster leader may include VRU cluster information that the VRU cluster leader leads in the VRU message and may transmit the VRU message. VRU cluster members included in the corresponding VRU cluster may stop the VRU message transmitted from the VRU Cluster members, may analyze information included in the VRU message transmitted from the VRU cluster leader, and may determine whether the VRU cluster members are included a dimension of a VRU cluster and whether a moving direction and a speed of the VRU cluster member and a moving direction and a speed of the VRU cluster are within a specific range. The VRU cluster member may continuously monitor information on a cluster, transmitted by the VRU cluster leader.

For VRU clustering, both a leader and a member of the VRU cluster may require a function of receiving a V2X messages transmitted by other VRUs. Hereinafter, the present disclosure proposes a method of reducing a risk of VRU collision through V2X communication while minimizing battery consumption of a VRU device through a method of minimizing a function of receiving a VRU message transmitted from a VRU cluster leader by the VRU cluster member.

An embodiment proposes a method in which a member belonging to a VRU cluster reduces a time of turning on a reception function to receive a VRU cluster indication message transmitted from a leader by allocating a time slot in which a VRU cluster leader is capable of transmitting the VRU cluster indication message.

Figure 17:
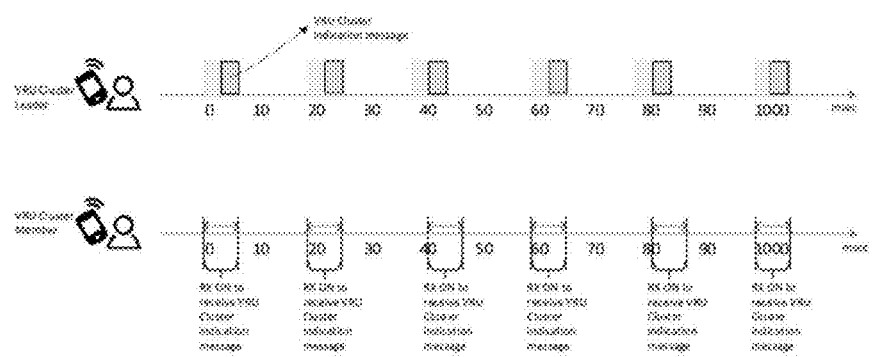

A VRU cluster leader to which a time slot of the VRU cluster indication message is not allocated may transmit the VRU Cluster indication message including information related to the VRU cluster that the VRU cluster leads whenever transmitting the VRU message. FIG. 17 shows the case in which a VRU message of 5 Hz is transmitted.

VRU cluster leader: A VRU cluster leader transmitting a VRU message may transmit the VRU message 5 times for 1 second (total 1000 msec) according to a transmission period, and the VRU message may include a VRU cluster indication message.

VRU cluster member: To receive a VRU cluster indication message transmitted by the VRU cluster leader, the VRU cluster member may repeatedly switch between a receive ON mode and a receive OFF mode according to a transmission period of a message.

When the time slot of the VRU cluster indication message is allocated based on 1 second, the VRU cluster member may turn on a receive mode for a time including an allocated time slot time or a time slot time+front and back margin values to receive the VRU cluster indication message.

Figure 18:
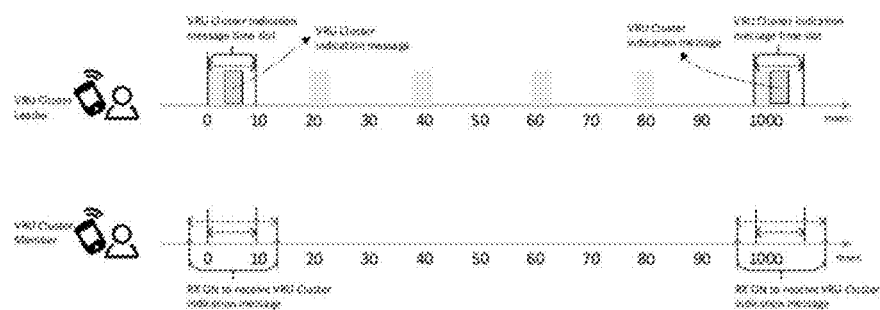

FIG. 18 shows an example in which a VRU cluster leader transmitting a VRU message of 5 Hz allocates a time slot of a VRU cluster indication message to 0 to 10 msec.

VRU cluster leader: A VRU cluster leader may transmit a VRU cluster indication message in an allocated time slot.

VRU cluster member: A VRU cluster member may turn on a receive mode for a time including a time slot in which the cluster indication message is capable of being transmitted or front and back margin times and may receive the cluster indication message.

According to an embodiment, it may be assumed that accurate time synchronization between the VRU cluster leader and members is achieved, and time slots may be allocated based on 1 second, which is the maximum period of the VRU message. When the VRU cluster member does not receive the cluster indication message of the VRU cluster for 1 second or more, the VRU cluster member may turn on a reception function for 1 second to receive the cluster indication message, and may match subsequent time slot synchronization.

In relation to specifying of the next VRU cluster message transmission time, an embodiment proposes a method of including an estimated time of transmission of a next transmitted VRU cluster message when a VRU Cluster leader transmits a VRU Cluster message. Through this method, VRU cluster members that are not capable of charging power while moving may reduce battery consumption by reducing a time during which a reception function is turned on to receive a cluster message. In other words, in the embodiment, the VRU Cluster leader may transmit a VRU Cluster message including information on a transmission period (or VRU cluster message interval) that is dynamically and appropriately changed according to its mobility information rather than a fixed transmission period, to the VRU cluster members. In this case, the VRU cluster member may monitor a next VRU cluster message according to the VRU cluster message interval included in the VRU cluster message, and may reduce battery consumption more efficiently than when monitoring the VRU cluster message at a fixed period.

As shown in Table 10 below, the VRU cluster message may include NextVruClusterMessageInterval Data Element.

TABLE 10

| | |
|---|---|
| Descriptive Name | VRUClusterMessage |
| Identifier | DataType_xxx |
| ASN.1 representation | VRUClusterMessage ::= SEQUENCE { VruClusterId VruClusterId, ... NextVruClusterMessageInterval NextVruMessageClusterInterval ... } |
| Definition | This DF (Data Frame) conveys VRU Cluster message. |
| Unit | N/A |

A NextVruClusterMessageInterval value may be expressed as an integer expressed in milliseconds, and a VRU cluster leader may expect a path thereof in consideration of a speed and heading value of the VRU cluster leader, may calculate a time at which the current value is changed to be greater a predetermined reference value, and may apply the calculated time to this value. That is, the VRU cluster leader may determine a value of NextVruClusterMessageInterval based on mobility information of the VRU cluster leader. This value may have a value greater than 100 millisec that is a transmission of the minimum VRU cluster message and the maximum value may be limited to 5 seconds for safety of the VRU.

TABLE 11

| | |
|---|---|
| Descriptive Name | NextVruClusterMessageInterval |
| Identifier | DataType_xxx |
| ASN.1 representation | NextVruClusterMessageInterval::= INTEGER(100..5000) |

TABLE 11-continued

| | |
|---|---|
| Definition | This DE (Data Element) indicates the time interval when the next VRU Cluster message transmitted. |
| Unit | N/A |

In general, a leader of a VRU cluster with an average VRU profile of 1 has a walking speed of 1.1 m/sec. When a time the leader of the VRU cluster is capable of reaching 1.1 m from the current walking speed exceeds 1 sec, the next VRU message interval may be determined based on the speed.

If a VRU cluster leader is to change the traveling direction to 45 to 135 degree or −45 to −135 degree direction from a heading direction to which the VRU cluster leader is currently directed, a timing of changing the direction may be measured as the next VRU message interval.

When the VRU cluster leader is in a stationary state, if it is possible to predict a time to start moving, the time may be measured as a next VRU cluster message interval.

The VRU cluster leader may determine a value of NextVruClusterMessageInterval based on a time when a change in speed and/or moving direction related to his mobility information is predicted.

Alternatively, the VRU cluster leader may not include NextVruClusterMessageInterval in the VRU cluster message or NextVruClusterMessageInterval configured with a specific bit value when change in speed and/or moving direction related to mobility information of the VRU Cluster leader is not predicted. In this case, the VRU cluster member may monitor the VRU cluster message according to the existing fixed transmission period.

That is, the VRU cluster leader may determine whether to include NextVruClusterMessageInterval in the VRU cluster message based on mobility information of the VRU cluster leader, and thus the VRU cluster member may indicate whether to monitor the VRU cluster message according to the existing fixed transmission period.

An embodiment proposes a method of reducing uncertainty that reception of a VRU cluster message is not guaranteed by 100% due to an unpredictable situation as shown below when only a Next VRU cluster Message Interval value is determined and a reception period is adjusted by turning on a function of receiving the Next VRU cluster message.

When a message is not yet generated at a prediction time by a device for transmitting a VRU cluster message Alternatively, when a message is generated at a prediction time by a device for transmitting the VRU cluster message but a delay time is generated in actual transmission.

In the above case, a receiving device may turn on a reception function after NextVruClusterMessageInterval but may not receive the VRU cluster message. When a transmitting device is not capable of tolerating a delay time and determines that there is no message, and turns off a reception function, it may not be possible to receive the corresponding VRU cluster message. To reduce this uncertainty, an embodiment proposes a method of including MaxLatencyTime Data Element in the VRU cluster message as shown in Table 12 below.

TABLE 12

| | |
|---|---|
| Descriptive Name | VRUClusterMessage |
| Identifier | DataType_xxx |
| ASN.1 representation | VRUClusterMessage ::= SEQUENCE { VruId VruId, ... |

TABLE 12-continued

|  |  |
|---|---|
|  | NextVruClusterMessageInterval NextVruClusterMessageInterval, MaxLatencyTime MaxLatencyTime, ... } |
| Definition | This DF (Data Frame) conveys VRU Cluster message. |
| Unit | N/A |

A MaxLatencyTime value may be expressed as an integer expressed in milliseconds and this value may mean the maximum latency time during which the VRU device does not turn off the reception function immediately if the VRU device does not receive the VRU message when the reception function is turned on according to the NextVruClusterMessageInterval.

TABLE 13

| Descriptive Name | MaxLatencyTime |
|---|---|
| Identifier | DataType_xxx |
| ASN.1 representation | MaxLatencyTime::= INTEGER(10..50) |
| Definition | This DE (Data Element) indicates the maximum latency time if the VRU device didn't get any VRU Cluster message even though the receiving function was turned on for the next VRU Cluster message according to the time interval. |
| Unit | N/A |

Figure 19:
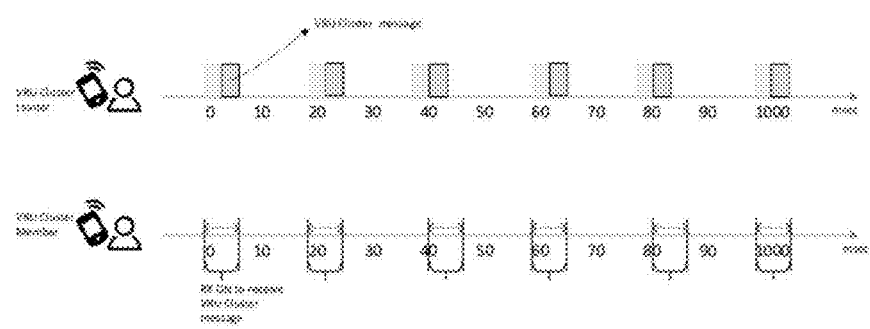

As shown in FIG. 19, when a VRU cluster message is transmitted without specifying a next interval and a max latency time in the VRU cluster message, members of the VRU cluster needs to turn on a Receive ON according to a transmission period of a VRU message and to receive the VRU cluster message transmitted by the VRU cluster leader. Alternatively, the VRU cluster leader may determine or estimate a processing time (or an average time) of the VRU cluster leader of the VRU cluster message and/or a reception delay time depending on a distance with VRU cluster members to determine MaxLatencyTime. Alternatively, the reception delay time according to the distance from the VRU cluster members may be estimated in consideration of timing advance (TA) information related to each of the VRU cluster members.

Figure 20:
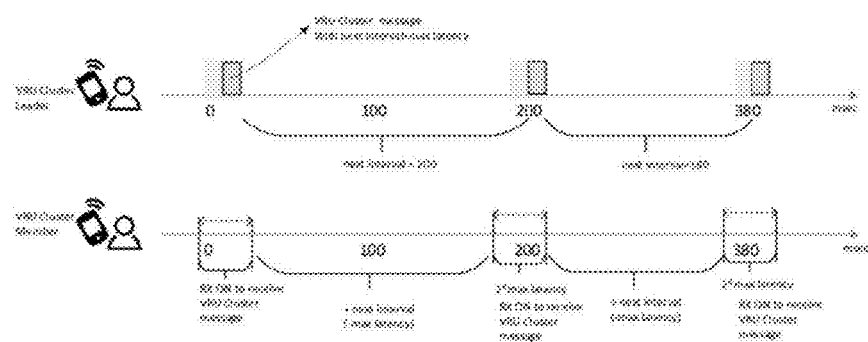

According to proposal according to the embodiment, when the next VRU cluster message interval and the max latency time are transmitted in the VRU cluster message, the VRU cluster member may minimize a time at which a reception function is turned on to reduce battery consumption. FIG. 20 shows the case in which a next interval and a max latency time are transmitted in the VRU message.

Figure 21:
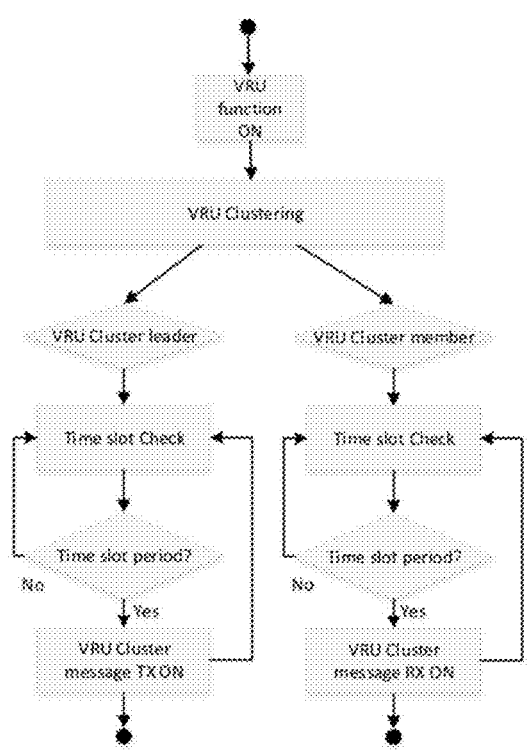
Figure 22:
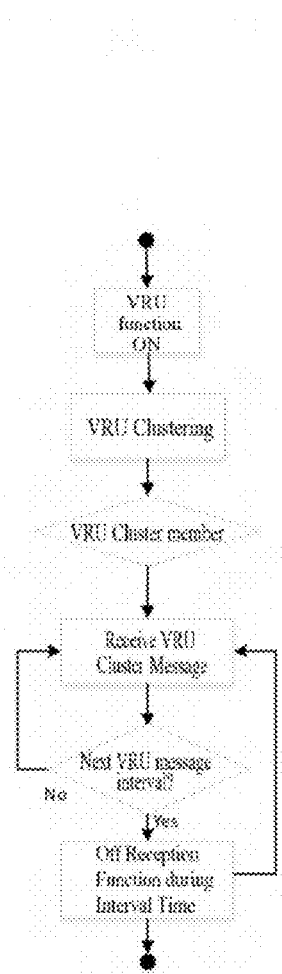

FIGS. 21 to 22 exemplify a flowchart of RX ON related to an embodiment, and each step may be referred to in the above description.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 illustrates a communication system 1 applied to the present disclosure.

Referring to FIG. 18, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of a Vehicle or an Autonomous Driving Vehicle Applicable to the Present Disclosure FIG. 20 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

FIG. 21 illustrates a vehicle applied to the present disclosure. The vehicle may be implemented as a transport means, an aerial vehicle, a ship, etc.

Referring to FIG. 21, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

FIG. 22 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 22, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 23:
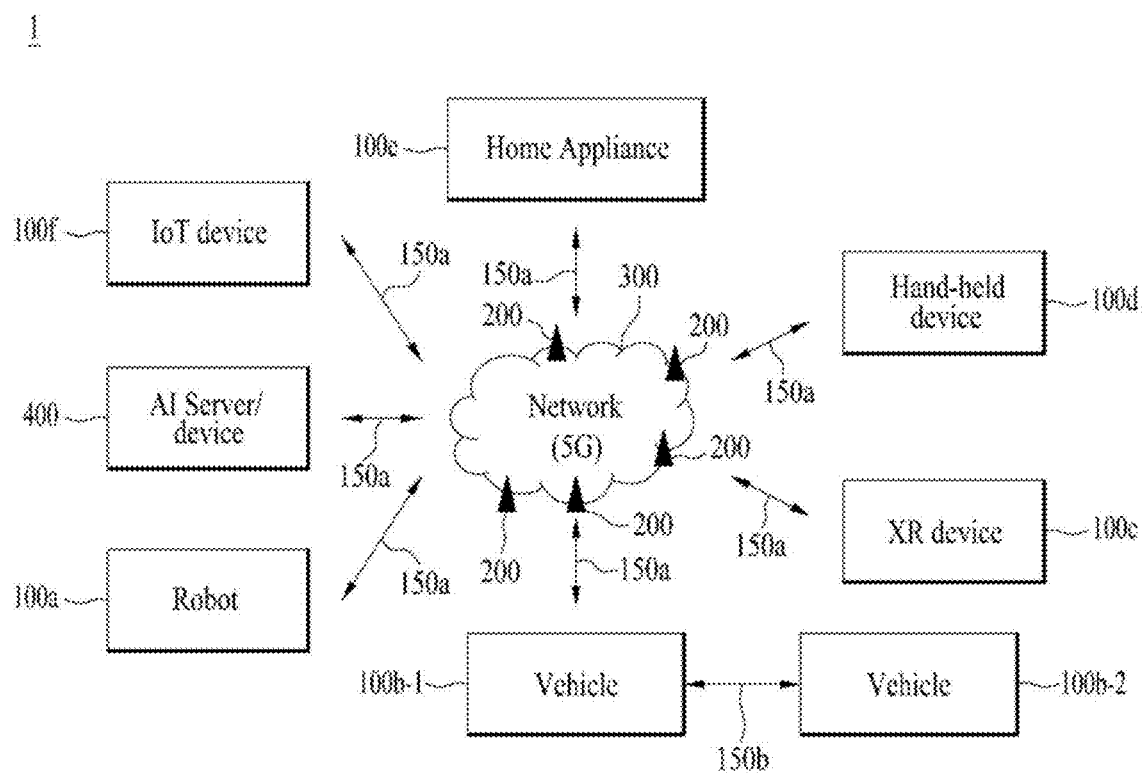
FIGS. 23 to 29 are diagrams for explaining various devices to which embodiment(s) are applicable.

FIG. 23 illustrates a robot applied to the present disclosure. The robot may be categorized into an industrial robot, a medical robot, a household robot, a military robot, etc., according to a used purpose or field.

Referring to FIG. 23, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 19, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI Device to which the Present Disclosure is Applied

Figure 24:
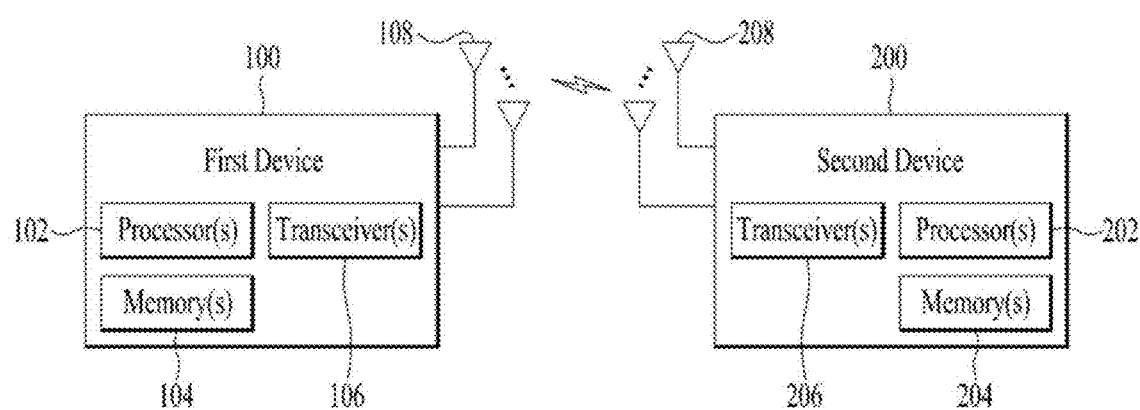
Figure 25:
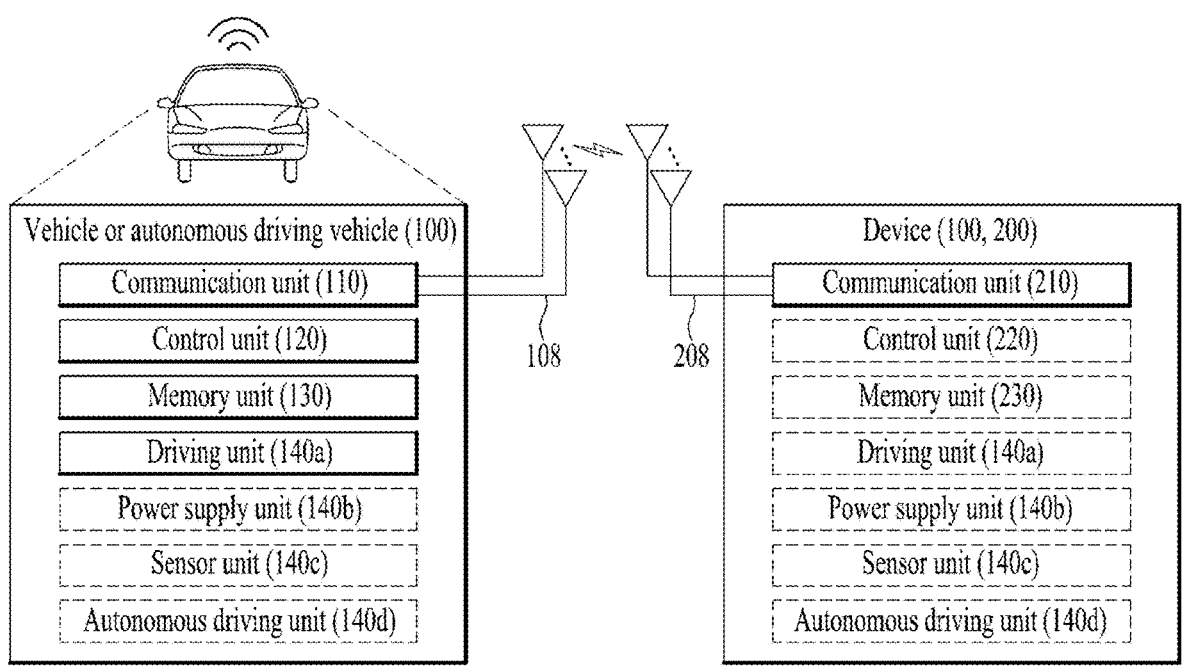
Figure 26:
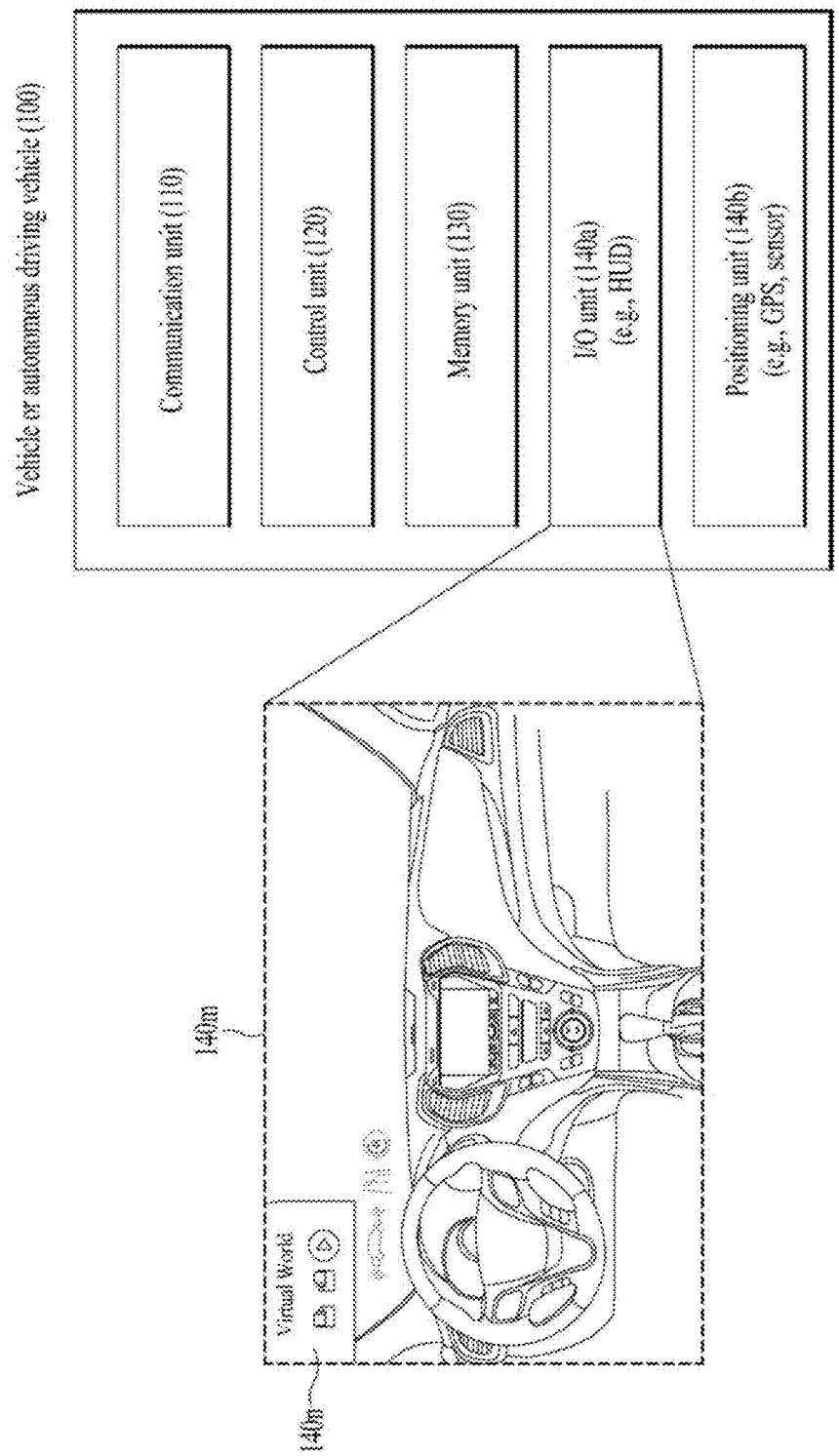
Figure 27:
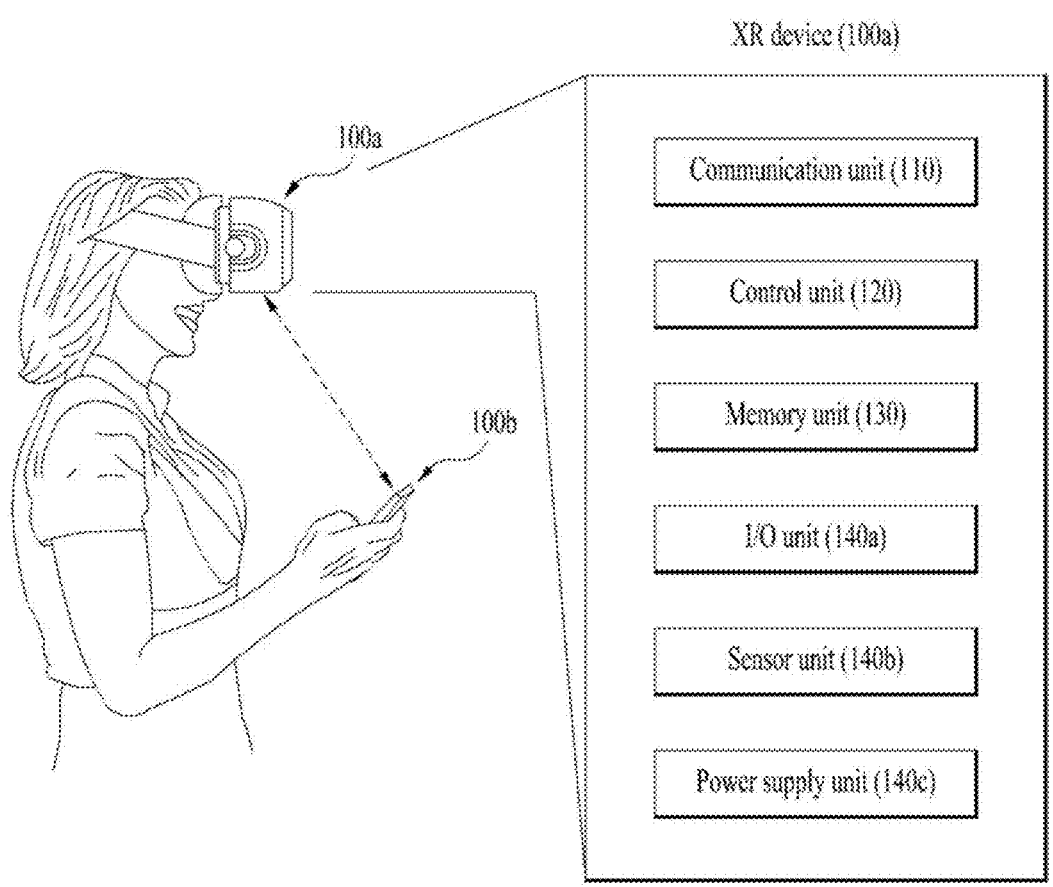
Figure 28:
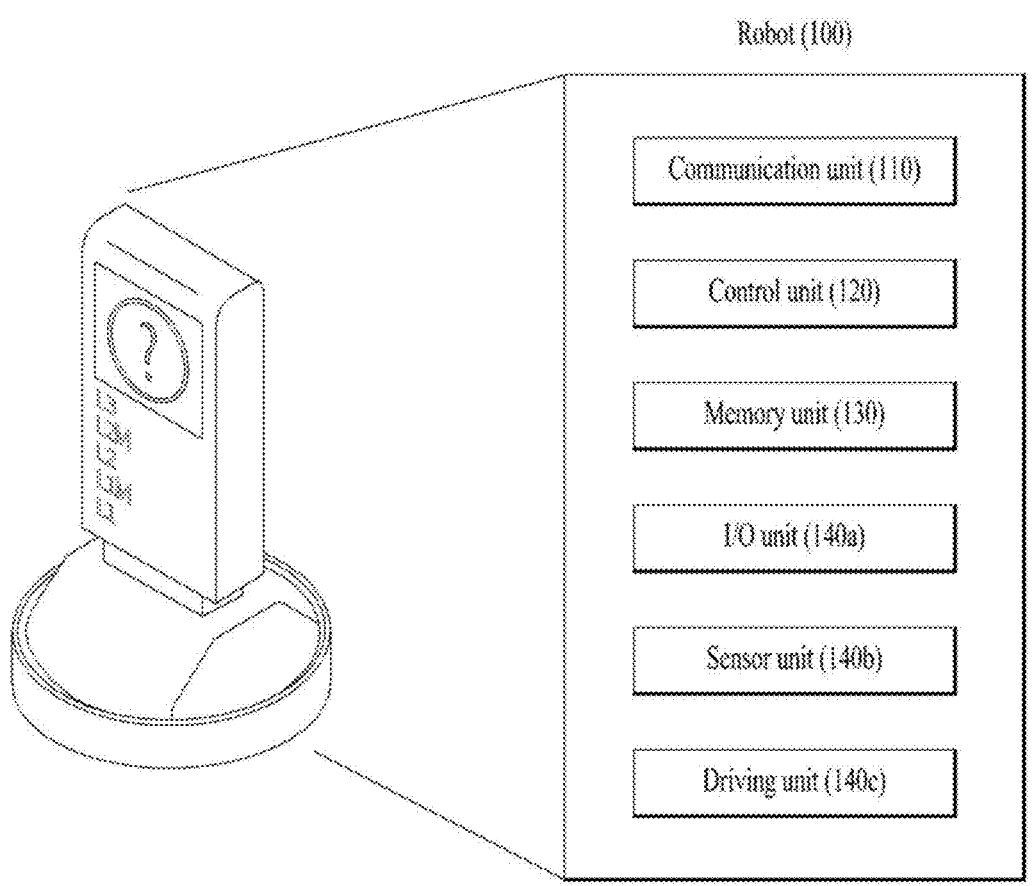
Figure 29:
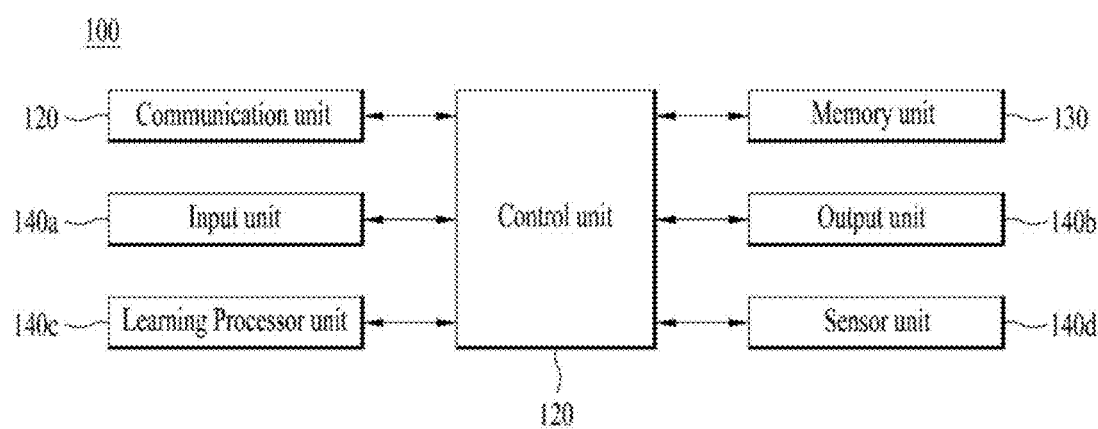

FIG. 24 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 24, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 19, respectively.

The communication unit 110 may transmit and receive wired/radio signals (e.g., sensor information, user input, learning models, or control signals) to and from external devices such as other AI devices (e.g., 100x, 200, or 400 of FIG. 18) or an AI server (e.g., 400 of FIG. 18) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 18). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 18). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:

1. An operation method related to a device to device direct communication of a first vulnerable road user (VRU) in a wireless communication system, the method comprising:
receiving a first VRU message from a second VRU by the first VRU;
turning off a VRU receiver for a time corresponding to an interval included in the first VRU message by a first VRU; and
turning on the VRU receiver after the interval and receiving a second VRU message by the first VRU,
wherein the interval is determined by the second VRU, based on a duration from a transmission of the first VRU message by the second VRU to a scheduled time when a moving direction of the second VRU is expected to change by a reference value or more.

2. The method of claim 1, wherein the first VRU message includes information on a speed, a direction, and a position of the VRU.

3. The method of claim 1, wherein a maximum value of the interval is set.

4. The method of claim 1, wherein, when the second VRU is in a stationary state, the interval is a time during which the second VRU is expected to move.

5. The method of claim 1, wherein the first VRU message includes information indicating a predetermined waiting time after turning on a VRU receiver after the interval.

6. The method of claim 1, wherein a VRU message reception related profile of the second VRU is preset according to a VRU type.

7. The method of claim 6, wherein the VRU type includes a pedestrian, a cycle, a motorcycle, and an animal.

8. The method of claim 7, wherein, when the VRU type is the pedestrian, a profile 1 that is the VRU message reception related profile does not receive a VRU message.

9. The method of claim 8, wherein whether the profile 1 operates is determined based on one or more of a VRU type, and mobility information.

10. The method of claim 9, wherein the mobility information includes connectivity with a moving device of a VRU, and a moving speed.

11. A first vulnerable road user (VRU) in a wireless communication system, comprising:
- at least one processor; and
- at least one computer memory operatively connected to the at least one processor and configured to store instructions that when executed causes the at least one processor to perform operations,
- wherein the operations includes:
- receiving a first VRU message from a second VRU by the first VRU;
- turning off a VRU receiver for a time corresponding to an interval included in the first VRU message by a first VRU; and
- turning on the VRU receiver after the interval and receiving a second VRU message by the first VRU, and
- wherein the interval is determined by the second VRU, based on a duration from a transmission of the first VRU message by the second VRU to a scheduled time when a moving direction of the second VRU is expected to change by a reference value or more.

12. A processor for performing operations for a first vulnerable road user (VRU) in a wireless communication system, the operations comprising:
- receiving a first VRU message from a second VRU by the first VRU;
- turning off a VRU receiver for a time corresponding to an interval included in the first VRU message by a first VRU; and
- turning on the VRU receiver after the interval and receiving a second VRU message by the first VRU,
- wherein the interval is determined by the second VRU, based on a duration from a transmission of the first VRU message by the second VRU to a scheduled time when a moving direction of the second VRU is expected to change by a reference value or more.

13. A non-transitory computer-readable storage medium for storing at least one computer program including an instruction for causing at least one processor to perform operations for a user equipment (UE) when being executed by the at least one processor, the operations comprising:
- receiving a first VRU message from a second VRU by the first VRU;
- turning off a VRU receiver for a time corresponding to an interval included in the first VRU message by a first VRU; and
- turning on the VRU receiver after the interval and receiving a second VRU message by the first VRU,
- wherein the interval is determined by the second VRU, based on a duration from a transmission of the first VRU message by the second VRU to a scheduled time when a moving direction of the second VRU is expected to change by a reference value or more.

* * * * *